June 6, 1933. E. M. DE SHERBININ ET AL 1,912,764
NUT THREADING MACHINE WITH STRAIGHT SHANK TAP
Filed Oct. 19, 1931 4 Sheets-Sheet 1
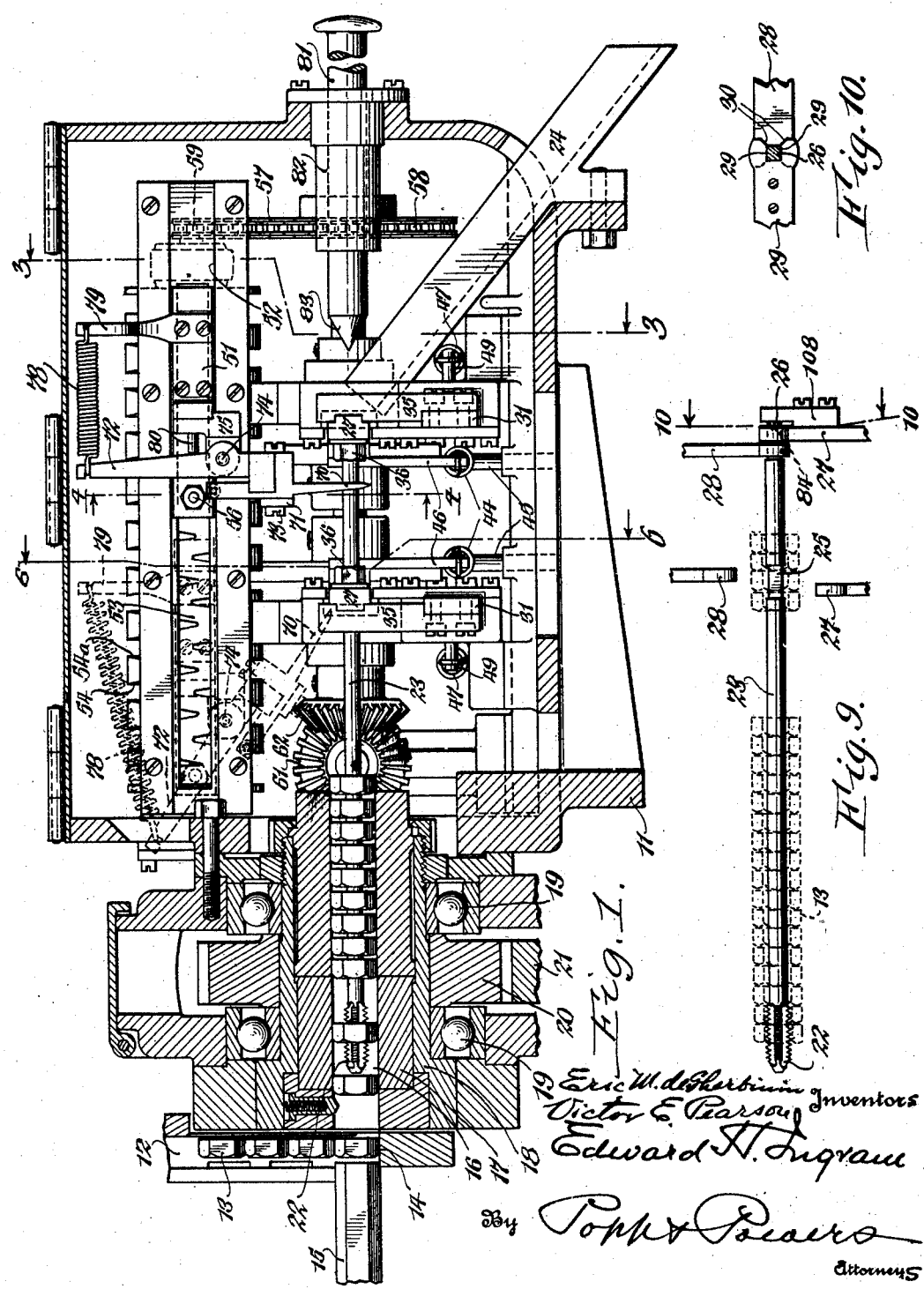

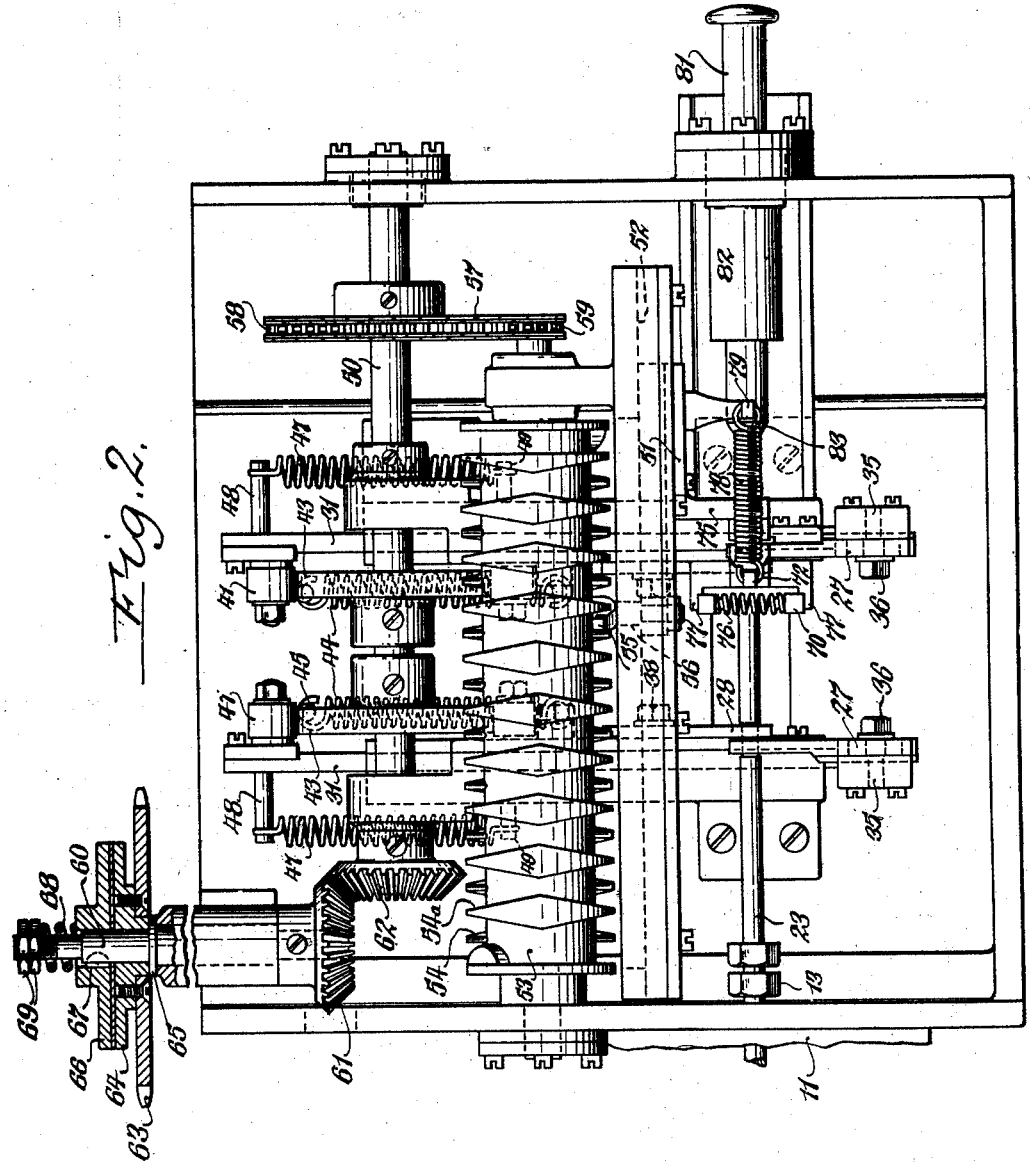

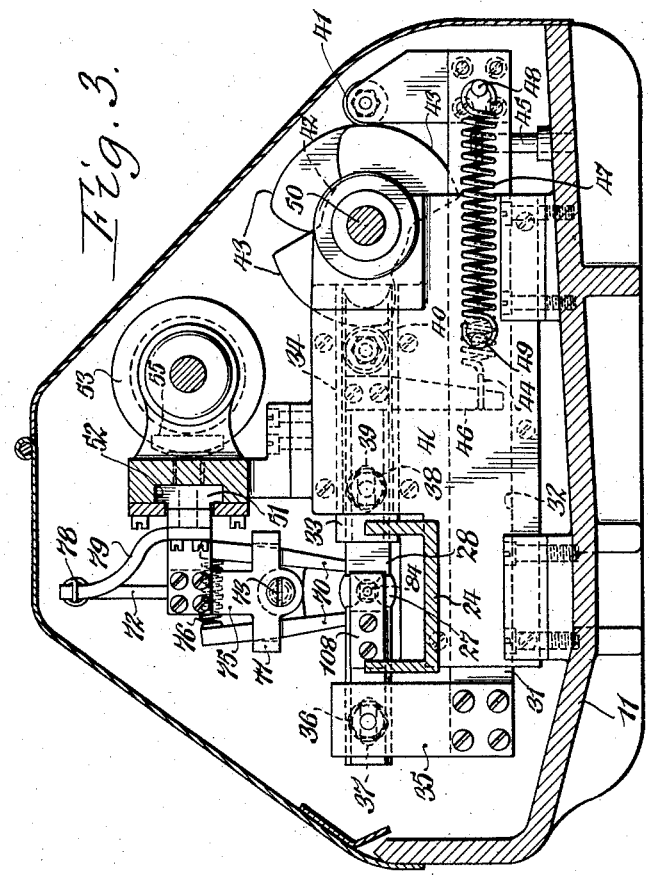
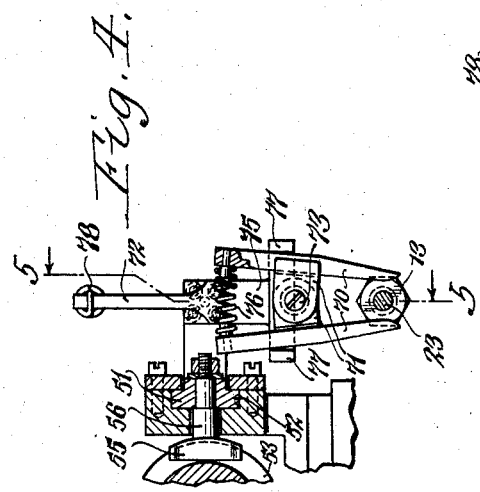
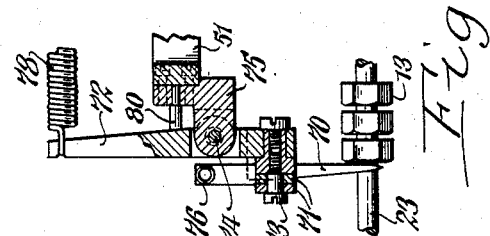

June 6, 1933.  E. M. DE SHERBININ ET AL  1,912,764
NUT THREADING MACHINE WITH STRAIGHT SHANK TAP
Filed Oct. 19, 1931  4 Sheets-Sheet 4
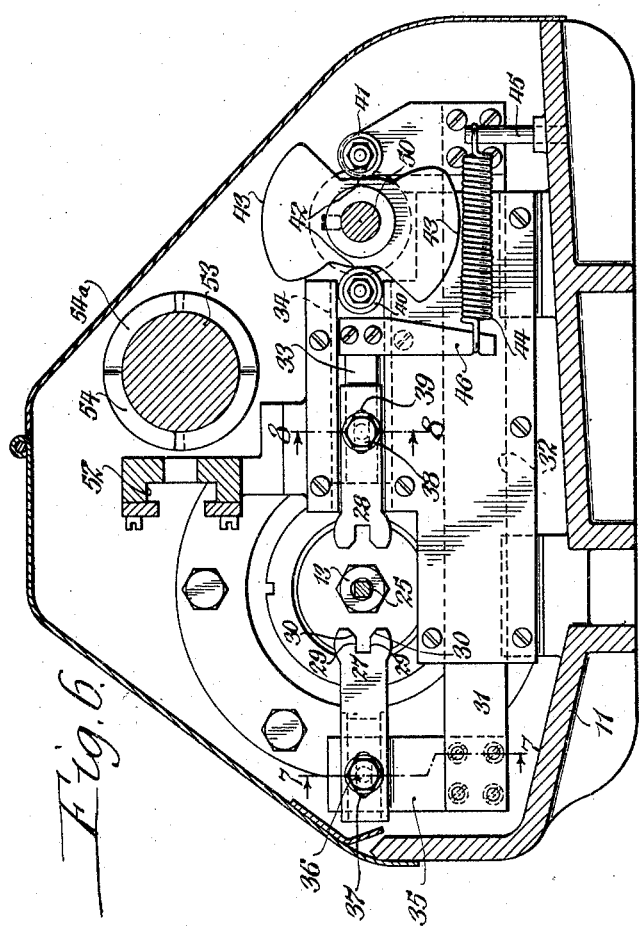

Patented June 6, 1933

1,912,764

UNITED STATES PATENT OFFICE

ERIC M. DE SHERBININ, OF MERION, PENNSYLVANIA, VICTOR E. PEARSON, OF BUFFALO, NEW YORK, AND EDWARD H. INGRAM, OF PHILADELPHIA, PENNSYLVANIA, ASSIGNORS, BY MESNE ASSIGNMENTS, TO HELEN KOCH DE SHERBININ

NUT THREADING MACHINE WITH STRAIGHT SHANK TAP

Application filed October 19, 1931. Serial No. 569,566.

This invention relates to a machine for threading nut blanks and similar articles and more particularly to means propelling nut blanks or the like along a threading tap having a straight shank.

It is the purpose of this invention to provide means for propelling nut blanks lengthwise of a tap having a straight shank which are strong and durable, reliable in operation and not likely to get out of order when subjected to severe usage.

In the accompanying drawings:

Figure 1 is a fragmentary vertical longitudinal section of a nut blank threading machine equipped with our invention.

Figure 2 is a top plan view thereof.

Figures 3 and 4 are vertical cross sections on the correspondingly numbered lines in Figure 1 but having the jaws of the front tap shank holding device in an open position.

Figure 5 is a fragmentary longitudinal section taken on line 5—5 of Figure 4.

Figure 6 is a cross section taken on line 6—6 of Figure 1.

Figures 7 and 8 are fragmentary sections taken on the correspondingly numbered lines in Figure 6.

Figure 9 is a fragmentary plan view of the tap and its shank and one of the positions of the holding devices relative to the tap shank.

Figure 10 is a transverse section taken on line 10—10 of Figure 9.

In the following description similar characters of reference indicate like parts in the several forms of the drawings.

Although our improvements are shown in the drawings in connection with a machine in which the nut blanks are moved horizontally while being threaded it is to be understood that these improvements are equally applicable to a machine in which nut blanks move vertically while being threaded.

The numeral 11 represents the main frame of the machine which may be of any suitable construction to support the different working parts.

Upon the front part of this frame is arranged an upright magazine 12 which is adapted to receive an upright tier or pile of nut blanks 13, or the like which are to be threaded internally, the lowermost one of the tier resting on the bottom 14 of the magazine and each nut blank after reaching this bottom being in turn pushed forward toward the threading mechanism by a horizontally reciprocating plunger 15.

As this plunger moves forwardly it pushes the lowermost nut blank 13 from the bottom of the magazine into the horizontal bore 16 of a rotary chuck 17 which bore conforms to the peripheral shape of the nut blank and thereby compels the same to turn together while the blank moves lengthwise and forwardly through the chuck. The latter is mounted in a horizontal hollow shaft 18 which is journalled by bearings 19 on the main frame and is turned by any suitable driving means including preferably a driven gear wheel 20 secured to the hollow shaft, and a driving wheel 21 meshing with the driven wheel.

The numeral 22 represents a horizontal screw thread cutting tap which is arranged axially within the front part of the bore of the chuck and onto which the nut blanks are pushed successively from the magazine by the plunger. This tap is formed on the front end of a horizontal shank 23 which is perfectly straight and has its front part arranged axially with the rear part of the chuck while the rear part of the shank projects rearwardly beyond the chuck a considerable distance.

Means are provided for holding the tap and its shank against turning so that the nut blank when pushed over the tap and also rotated will have an internal screw thread cut therein by the tap. After the cutting of this thread has been completed the threaded nut passes from the tap onto the plain shank and thence forwardly on the latter and finally escapes from the rear end of the shank and drops into a chute 24 which directs the same into a suitable receptacle or onto the adjacent part of the floor.

In order to permit of thus moving the nut blanks from the front end of the tap and forwardly over the same and the threaded nuts forwardly from the front end of the shank and off the rear end of the same, means are provided which intermittently grasp the shank at different points in its length and permit the nuts to slide forwardly along the shank on one part thereof while another part thereof is grasped for holding the shank and tap against turning.

The preferred means for thus holding the shank and tap against turning as shown in the drawings are constructed as follows:—

At a point in rear of the chuck a front shank holding device is provided and adjacent to the rear end of the shank a rear shank holding device is provided which holding devices are substantially alike in construction and operation and the following description of one will therefore apply to both.

The numeral 25 represents a front reduced and squared or flattened holding neck formed on the tap shank in rear of the chuck and 26 represents a similar reduced and squared or flattened holding neck formed on the rear end of the shank. Each of these holding necks is adapted to be engaged by a pair of holding jaws 27, 28, each having a mouth the sides 29 of which are flat and adapted to engage the opposite sides of one of the reduced holding necks and inclined lips 30 on the entrance of the mouth for the purpose of guiding the respective jaw onto the adjacent holding neck. Each pair of holding jaws are arranged lengthwise out of line with each other and are reciprocated transversely and horizontally relative to the respective neck from opposite sides of the same so that the jaws of each pair either interlock with a neck of the shank, as shown at the right of Figure 9 and in Figure 10, for holding the same against turning at one part of the shank, or these jaws are disengaged from the respective neck of the shank, as shown at the left of Figure 9 and in Figure 6, and thus clear the space around the respective part of the shank to permit the passage of nut blanks lengthwise over the same from the front to the rear end of the shank.

The means whereby the holding jaws of each pair are moved into and out of engagement with a neck of the shank from opposite sides of the latter comprise a lower long slide 31 which runs transversely in a track 32 on the lower part of the main frame, an upper short slide 33 which runs transversely in a track 34 in the upper part of the main frame, an arm 35 projecting upwardly from the outer end of the long slide and adjustably connected with the outer end of the jaw 27 by a bolt 36 passing through a horizontal slot 37 in the jaw 27 and into said arm 35, a bolt 38 passing through a horizontal slot 39 in the jaw 28 and into the short slide for adjustably connecting the same, shifting rollers 40, 41 arranged on adjacent ends of the long and short slides, a rotary cam arranged between said shifting rollers and having two receding faces 42, and two salient faces 43 which are engaged successively with the companion shifting rollers 40, 41, a spring 44 connected by a pin 45 with the frame and by an arm 46 with the short slide, a spring 47 connected by a pin 48 with the long slide and by a pin 49 with the frame, and a rotary cam shaft 50 journaled lengthwise on the main frame on one side of the tap and shank and carrying both of the cams.

As each cam rotates the salient faces of the same spread the shifting rollers 40, 41 and thereby move the respective jaws 27, 28 into interlocking engagement with the respective neck of the shank for holding the same against turning and as the receding faces of this cam are presented to the rollers 40, 41 then the latter are drawn inwardly and the jaws 27, 28, are withdrawn from engagement with the respective neck of the shank by the resilience of the springs 47 and 44 thereby clearing the path for nut blanks along the adjacent part of the tap shank. The timing of the two cams of the front and rear shank holding device is so arranged that at times both pairs of jaws 27, 28 engage simultaneously with the squared front and rear necks of the shank so that the shank and tap are firmly held against turning while a nut blank is being fed by the plunger from the magazine against the front end of the tap, while at another time the jaws of the front holding device are disengaged from the shank to permit threaded nut blanks to pass rearwardly along the front part of the shank and still another time the jaws of the rear holding device are disengaged from the shank to permit threaded blanks to pass rearwardly along the shank and escape from the rear end of the same, but at no time are the jaws of both the front and rear holding device out of engagement with the respective necks of the shank thereby assuring holding the tap and shank against turning at all times.

Although the engagement of the pairs of holding jaws with the reduced necks serves to prevent rearward longitudinal movement of the tap and shank while subjected to the longitudinal pressure of the plunger against the foremost next blank which is being fed to the tap additional thrust resisting means are provided consisting of a thrust arm 108 which is mounted on the rearmost holding jaw 27 and is adapted to be moved by the latter across the rear end of the shank when the jaws of the rear holding device engage the rear neck of the shank, as shown in Figures 3 and 9, whereby rearward movement of the tap and shank is prevented while subjected to the rearward thrust of the nut feeding mechanism.

When the machine is so built that the nut blanks move downwardly on the tap and shank gravity can be utilized as part or all of the force to move the nut blanks along the shank. But when the tap and shank arranged horizontally positive means are necessary for propelling the nut blanks along the shank from the front to the rear end of the same. The means for this purpose which embody the present invention are constructed as follows:—

The numeral 51 represents a sweeping carriage or slide reciprocating lengthwise and horizontally in the upper part of the machine and running in a track 52 mounted on the frame parallel with the tap and shank. Any suitable means may be employed for effecting the reciprocating movement of the sweeping carriage, those shown in the drawings comprising a horizontal sweep. Screw shaft 53 is journaled in suitable bearings on the main frame adjacent to the outer side of the track 52 and provided with two oppositely trending screw threads 54, 54a, a tracing shoe 55 pivoted by a pin 56 on the sweeping carriage and running in the threads of said sweep shaft. As this shaft rotates continuously in the same direction the shoe 55 is first moved lengthwise of the tap and shank in one direction by one of the helical threads of the sweep shaft and upon reaching the end of this thread in the latter the shoe is reversed and moved in the opposite direction by the other helical thread of the sweep shaft, this operation recurring as the shoe reaches either end of the helical threads of the sweep shaft and thus effecting reciprocation of the sweep carriage. The sweep shaft may be rotated in various ways for example by a chain belt 57 passing around a large sprocket wheel 58 on the cam shaft 50 and a small sprocket wheel 59 on the sweep shaft. Rotary movement of the cam shaft 50 is derived in the present case from a driving shaft 60 which is journaled on the main frame at right angles to the cam shaft and connected with the latter by intermeshing bevel gear wheels 61, 62, secured respectively to the shafts. Rotation of the driving shaft is effected by a driving chain belt passing around a sprocket wheel 63 which is frictionally connected with the driving shaft so as to permit this sprocket wheel 63 to slip in case the nut threading machine becomes jammed for any reason and this prevents injury to the machine under such circumstances. This frictional connection preferably consists of a driving friction disk 64 secured to the wheel 63 and engaging a shoulder 65 on the shaft 60, a driven friction disk 66 engaging said driving disk and connected by a spline 67 with the driving shaft 60, and a spring 68 interposed between the driven disk 66 and lock nuts 69 on the shaft 60 and operating to press the disks 64, 66 frictionally into engagement with each for transmitting motion from the sprocket wheel 63 to the driving shaft 60.

Upon the sweep carriage is mounted a sweeper which is adapted to engage the nut blank on the tap shank and move the same lengthwise thereof from a point in rear of the chuck to the rear part of the shank.

In its preferred form the sweeper comprises two propelling fingers 70 which are pivotally mounted on the sweep carriage in such a manner that the same may occupy an upright position during their forward movement with the sweep carriage and engage with the front side of nut blank on the tap shank for propelling the blank forwardly on this shank, as shown by full lines in Figures 1, 4 and 5 and the same can also tilt into a forwardly inclined position as shown by dotted lines in Figure 1, by tripping over the nut blanks during the rearward movement of the sweep carriage, and these propelling fingers are also capable of being spread transversely relative to each other so as to avoid getting the machine jammed or clogged if the propelling fingers at any time engage with the lateral sides of a nut blank instead of the front face thereof during the operation of the machine. These propelling fingers are provided on the opposing sides of their central parts with lugs 71 which are pivotally connected with each other and with a shifting lever 72 by a horizontal longitudinal pivot 73. This lever is in turn pivoted by a horizontal transverse pivot 74 with a bracket 75 forming part of the sweep carriage 51.

The propelling fingers are yieldingly held in position in which their lower operating ends are arranged so close together that they can engage the front face of a nut blank on the tap shank, this being effected by a spring 76 interposed between the upper ends of said fingers above the pivot 73, the movement of said fingers under the action of said spring 76 being limited by stops 77 on said shifting lever 72 which are engaged by said fingers 70 above the pivot 73. The tilting lever is yieldingly turned in the direction for swinging the propelling fingers rearwardly and downwardly into a vertical operative position by a spring 78 which connects the upper end of the shifting lever 72 with an upwardly projecting arm 79 forming part of the sweep carriage, as shown in Figure 1. The movement of the shifting lever 72 under the action of the spring 78 is limited by a stop 80 on the bracket 75 which is engaged by the upper arm of the shifting lever, as shown in Figure 5.

As the sweep carriage moves forwardly relative to the row of nut blanks on the tap shank the shifting lever is tilted by engagement of the lower ends of the propelling fingers 70 with the upper sides of the nut blanks on the tap shank. These fingers are dragged over these nut blanks in this manner until the sweep carriage reaches the end of its forward stroke. During the first part of the subsequent rearward stroke of the sweep carriage the shifting lever and propelling fingers assume an upright position under the action of the spring 78 during which time the lower operative ends of the propelling fingers pass downwardly between the adjacent two nut blanks and these fingers move rearwardly in engagement with the rearmost of the respective nut blanks so that all of the nut blanks on the tap shank in rear of the propelling fingers are moved rearwardly on the shank and eventually pushed off the rear end of the shank and discharged upon the chute 24. If the propelling fingers upon being lowered into their operative position should engage with opposite sides of a nut blank these fingers will spread the requisite extent, this being possible due to the spring 76 but when the propelling fingers are disengaged from the sides of a nut blank during the further operation of the machine the spring 76 again draws the propelling fingers together so that the same engage the front side of a nut on the top shank and operate to sweep the nuts rearwardly thereon.

The opening and closing of the front and rear shank holding devices is so timed relative to the rearward movement of the nut sweeping mechanism that the jaws of the front shank holding device are disengaged from the shank during the time the propelling fingers are effecting the first part of their rearward movement and pushing threaded nut blanks rearwardly on the tap shank and past the jaws of the front shank holding device. After the propelling fingers and the nut blanks in rear of the same have passed the jaws of the front holding device the latter are closed. Then the jaws of the rear shank holding devices are opened to permit the propelling fingers and the nut blanks in rear of the same to pass the same during the continued rearward movement of the fingers and the completion of their rearward stroke and after these fingers have cleared the jaws of the rear shank holding device these jaws are again closed for resuming holding of the tap shank against turning.

Preparatory to starting the operation of the machine the front end of the shank and the tap are held axially within the chuck by means of a pilot nut blank placed in the chuck and upon the tap or front part of the shank and the rear end of the shank is temporarily held against dropping out of axial alinement with the chuck by a centering pin 81 slidable lengthwise on a longitudinal guideway 82 formed on the rear part of the main frame and provided at its front end with a cone point 83 which is adapted to engage with a conical recess 84 in the rear end of the tap shank and hold the latter in central position relative to the axis of the chuck.

When the machine is in normal operation a plurality of nut blanks will be arranged on the tap and the front part of the shank within the chuck and thereby hold the tap and shank in their proper concentric position relative to thickness so that thereafter the centering pin 81 may be withdrawn as the same is no longer required.

We claim:

1. A machine for threading nut blanks and the like comprising a tap provided with a straight shank, means for holding said tap and shank against turning, and means for propelling the nut blanks lengthwise of said shank including a longitudinally reciprocating sweeper and means for actuating said sweeper including a carriage upon which said sweeper is mounted, a rotary shaft provided with reversely trending threads, and a tracing shoe pivoted on said carriage and running back and forth in said reversely trending threads.

2. A machine for threading nut blanks and the like comprising a tap provided with a straight shank, means for holding said tap and shank against turning, and means for propelling the nut blanks lengthwise of said shank including a carriage, a shifting lever pivoted on said carriage, a spring for turning said lever in one direction, a stop on said carriage for limiting the movement of said shifting lever under the action of said spring, a pair of shifting fingers pivoted on said lever and having operative ends adapted to engage the nut blanks on opposite sides of said shank, spring means for turning said fingers in the direction for drawing the operative ends thereof together and into position for engaging the faces of the nut blanks on the shank and stops on said lever for limiting the movement of said fingers under the action of the spring means which draw the operative ends thereof toward opposite sides of said shank.

3. A nut blank threading machine comprising a tap provided with a straight shank, a chuck which receives said tap and the front part of said shank, and means for temporarialy supporting the shank at its rear end so that the same is axially in line with the bore of said chuck, including a centering pin arranged in axial alinement with the bore of said chuck and slidable lengthwise on a support and provided at its front end with a conical centering point which is adapted to engage with a conical centering recess in the rear end of said shank.

In testimony whereof we hereby affix our signatures.

ERIC M. DE SHERBININ.
VICTOR E. PEARSON.
EDWARD H. INGRAM.